United States Patent
Fox et al.

[11] 3,890,299
[45] June 17, 1975

[54] CYTOKININ-7-NUCLEOSIDE

[75] Inventors: Eugene J. Fox; James D. McChesney, both of Lawrence, Kans.

[73] Assignee: Kansas University Endowment Association, Lawrence, Kans.

[22] Filed: Sept. 6, 1973

[21] Appl. No.: 394,883

[52] U.S. Cl. ............................. 260/211.5 R; 71/92
[51] Int. Cl.[2] .................. C07H 19/16; C07H 19/18
[58] Field of Search ............................. 260/211.5 R

[56] References Cited
UNITED STATES PATENTS

| | | | |
|---|---|---|---|
| 3,114,751 | 12/1963 | Whetstone | 260/211.5 R |
| 3,627,753 | 12/1971 | Posternak et al. | 260/211.5 R |

*Primary Examiner*—Johnnie R. Brown
*Attorney, Agent, or Firm*—Charles N. Blitzer; Larry Heeb

[57] ABSTRACT

There is provided, plant growth regulators of the cytokinin-7-nucleoside type, having the following formula:

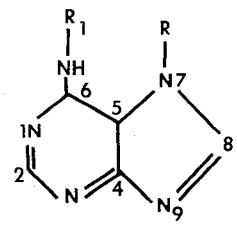

wherein $R_1$ represents an alkyl group of from one to eight carbon atoms, a branched alkyl group of from one to eight carbon atoms, an alkenyl group of from one to eight carbon atoms, a $R_3$—CO-group, wherein $R_3$ represents a member selected from the group consisting of an alkyl group of from one to eight carbon atoms, a branched alkyl group of from one to eight carbon atoms, an alkenyl group of from one to eight carbon atoms, and an aryl group, a —$CH_2$—$C_6H_5$ group, —$C_2H_4$—$C_6H_5$ group, and a —$CH_2$—Y group wherein Y represents a member selected from the group consisting of a heterocyclic group, a cycloalkyl group, and a cycloalkenyl group, and a —$CH_2$—$C_6H_4$—X group, wherein X represents an alkyl group of from one to three carbon atoms, a branched alkyl group of from one to three carbon atoms, an alkenyl group of from one to three carbon atoms, a branched alkenyl group of from one to three carbon atoms, a halogen atom, and a $CF_3$ group; and wherein R represents a simple sugar.

7 Claims, No Drawings

CYTOKININ-7-NUCLEOSIDE

BACKGROUND OF THE INVENTION

1. Field of the Invention

The present invention is directed to cytokinin-nucleoside compounds, which exhibit plant growth regulating activity and more particularly, the present invention is directed to certain novel cytokinin-nucleoside compounds of the 7-substituted type.

2. Description of the Prior Art

To date, cytokinin-nucleoside compounds have been well-established in the art, and more specifically, those compounds deemed the closest in terms of prior art to the compounds of this invention are those of the cytokinin-9-nucleoside type.

However, while these cytokinin-9-nucleoside compounds have been known to exhibit plant growth regulation activity, these compounds are extremely unstable. Consequently, when such compounds are introduced into an aqueous solution and administered to a specific host plant, such compounds are rapidly degraded, thus diminishing the therapeutic biological effect (plant growth regulation) attainable. In addition, the 9-cytokinin-nucleoside derivatives are less-soluble than the 7-derivatives of this invention, which fact further hinders the achievement of a true biological effect (growth regulatory activity). That is, cell penetration is impeded.

SUMMARY OF THE INVENTION

It is therefore an object of the present invention to provide novel cytokinin7-nucleoside compounds exhibiting growth regulatory activity in plants.

Still, it is another object of the present invention to provide novel cytokinin-7-nucleoside compounds which exhibit enhanced water solubility over the 9-cytokinin nucleoside compounds of the prior art.

Moreover, it is a third object of the present invention to provide novel cytokinin-7-nucleoside compounds which are unexpectedly stable when compared with the 9-cytokinin-nucleoside derivatives and which further have the capability, because of their solubility of penetrating the plant cell wall membrane in superior fashion when compared to the 9 cytokinin-nucleoside derivatives, thus permitting an overall superior biological effect (plant growth regulatory activity) to be achieved.

Accordingly, the present invention provides novel cytokinin-7-nucleoside compounds of the formula:

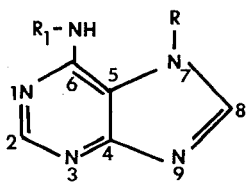

wherein $R_1$ represents a member selected from the group consisting of an alkyl group of from one to eight carbon atoms, a branched alkyl group of from one to eight carbon atoms, an alkenyl group of from one to eight carbon atoms, a $R_3$—CO—group, wherein $R_3$ represents a member selected from the group consisting of an alkyl group of from one to eight carbon atoms, a branched alkyl group of from one to eight carbon atoms, an alkenyl group of from one to eight carbon atoms, and an aryl group, a—$CH_2$—$C_6H_5$ group, a—$C_2H_4$—$C_6H_5$ group, and a $CH_2$—Y group, wherein Y represents a member selected from the group consisting of a heterocyclic group, a cycloalkyl group, and a cycloalkenyl group, and a—$CH_2$—$C_6H_4$—X group, wherein X represents an alkyl group of from one to three carbon atoms, a branched alkyl group of from one to three carbon atoms, an alkenyl group of from one to three carbon atoms, a branched alkenyl group of from one to three carbon atoms, a halogen atom (Cl, Br, or I), and a $CF_3$ group; and wherein R represents a simple sugar.

DETAILED DESCRIPTION OF THE INVENTION

With the foregoing in mind, the following discussion will serve to set forth the detailed embodiments of the present invention in light of the above generic disclosure.

Firstly, with respect to the definition of $R_1$, while alkyl, branched alkyl, and alkenyl groups of from one to eight carbon atoms are operative for purposes of this invention, those having a carbon range of from five to eight carbon atoms are preferred. In addition, any one of the alkyl, branched alkyl, or alkenyl groups can be further substituted with a member selected from the group consisting of a hydroxyl group and a halogen atom.

Similarly, with respect to the situation in which $R_1$ in the above noted member represents a—$CH_2$—$C_6H_5$ group or a—$C_2H_4$—$C_6H_5$ group, the phenyl group of either one of these moieties can be substituted with an alkyl group of from one to eight carbon atoms, a halogen atom, a nitro group, a hydroxy group, or a $CF_3$ group. Furthermore, when an alkyl group of from one to eight carbon atoms is employed in this sense, the methyl group is most preferred.

Finally, in defining $R_1$, when $R_1$ represents a—$CH_2$—Y group, wherein Y can represent a member selected from the group consisting of heterocyclic group, a cycloalkyl group, or a cycloalkenyl group, the following specie groups are preferred. For the heterocyclic group, a member selected from the group consisting of a furfuryl group, a pyridyl group, and a thiophene group are preferred. In the case where Y is a cycloalkyl group, those groups preferred are selected from among a cyclopentyl group, a cyclohexyl group, and a cycloheptyl group. Similarly, in the case where Y represents a cycloalkenyl group, a cyclopentenyl group, a cyclohexenyl group, and a cycloheptentyl group are preferred.

In further defining the case where Y represents a heterocyclic group, it must be noted that substituents can be placed on the heterocyclic moiety, said substituents being selected from the group consisting of a halogen atom, a hydroxy group, and a nitro group.

Turning to the definition for the substituent R, as indicated earlier, R can represent any simple sugar, such as for instance, ribose, mannose, galactose, fructose, glucose, (including both glucofuranose as well as glucopyranose), xylose, and the like. However, of all the simple sugars operative for the purpose of this invention, those of glucofuranose, glucopyranose, and xylose have provided the most superior results.

In connection with defining R as a simple sugar, it is noteworthy to emphasize that the superior properties exhibited by the cytokinin-7-nucleoside compounds of this invention and most particularly, the stability (biological) of such compounds, is due to the placement of a simple sugar moiety on the 7-position of the cytokinin-nucleoside structure.

Among all the compounds encompassed within the above described generic formula, three compounds have shown exceptional biological stability. With respect to the first compound, and referring to the above described generic formula, $R_1$ represents a benzyl ($-CH_2-C_6H_5$) group, while R represents a glucopyranose group. In the second instance, referring to the above generic formula, again, $R_1$ represents a benzyl group, while R represents a glucofuranose group. Finally, in the third instance, $R_1$ represents a benzyl group and R represents a xylofuranose. For further reference, in this application, these compounds will be referred to, respectively, as Compounds A, B, and C.

Insofar as the means are available to prepare the compounds encompassed within the above generic formula, a simple schematic, step-wise procedure is employed. Initially, a compound of the formula:

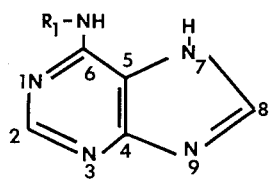

wherein $R_1$ is defined as above is reacted with a mercuric halide in the presence of sodium hydroxide to obtain the corresponding halo mercuri-salt (Cl, Br, I). Subsequently, this salt is then reacted with the appropriate acetylated simple sugar halide (chloride, bromide, iodide) in the presence of xylene, for a period of ⅓ to two hours, at a temperature of 100°C, thus obtaining the acetylated intermediate. Finally, the acetylated intermediate is then reacted with methyl alcohol in the presence of a 10% ammonium hydroxide solution, at 25°C, for a period of time approxiating 24 hours to thus obtain the finalized product, i.e., the corresponding cytokinin-7-nucleoside.

Once obtained, the compounds of the present invention are dissolved in water and administered to plants by any conventional, acceptable, horticultural means and in an effective therapeutic amount. For example, an aqueous solution of a compound of this invention can be directly administered to a plant by direct administeration of said solution into the plant circulatory system (intravenous route).

Normally, while the amount of a compound of this invention required to achieve plant growth regulatory activity will vary, depending upon the plant employed and the need of the plant, as a basic guideline, an amount of from 0.1 mcg/g of plant to 0.1mg/g of plant will suffice.

With the foregoing in mind, the present invention will be more adequately understood from a review of the following examples, which examples are simply illustrative and non-limitative thereof.

EXAMPLE I

Preparation of Compound A

Compound A is known as 6-benzylamino-7-beta-D-glucopyranosyl purine, or in the alternative, this compound can be termed $N^6$-benzyl-7-beta-D-glucopyranosyl adenine.

The procedure for the synthesis of this particular compound is that procedure described earlier in the present application, which procedure was disclosed by Davoll, J. and Lowry, B.A. *Journal American Chemical Society*, Volume 73, 1650–1655 (1951). The particular synthesis described in this example is an adaption of that procedure.

To a suspension of 6.89g (0.015mols) of the chloro-mercuri salt of $N^6$-benzyl-adenine in xylene, there was added 12.33g (0.03mols) of 2,3,4,6-tetra-O-acetyl-alpha-glucopyranosyl bromide and this mixture was then heated to reflux for 20 minutes in a reaction flask. The suspension dissolved and a syrupy precipitate appeared on the sides and bottom of the reaction flask. The xylene was removed in vacuo and the residue was dissolved in methanol and adjusted to 1.5N with concentrated ammonium hydroxide. The copious precipitate which formed, (inorganic salts of mercury) was removed through centrifugation. The resulting clear supernatant was reduced in vacuo to a brown, syrupy residue and this residue was further purified by chromatography means on silica gel (extra pure) using water as the eluent to yield 0.12g (2%) of $N^6$-benzyl-7-beta-D-glucopyranosyl adenine (6-benzylamino-7-beta-glucopyranosyl purine).

The U.V. spectrum of the above-subject compound was as follows: In a medium of 1/10 N $HCL/C_2H_5OH$(95%) the maximum and minimum values were 282 and 246nm, respectively; in a medium of 95% $C_2H_5OH$ per se, the maximum and minimum values were 274 and 239nm, respectively; and finally, in a medium of 1/10 $NH_4OH/C_2H_5OH$(95%), the maximum and minimum values were 274 and 239nm, respectively. The Epsilon reading was 15,000.

EXAMPLE II

Preparation of Compound B

The above-subject compound is known by two names, 6-benzyl-7-beta-D-xylofuranosyl-purine, or $N^6$-benzyl-7-beta-D-xylofuranosyl adenine.

The procedure employed to prepare this particular compound was identical to the procedure employed to prepare the compound set forth in Example I (Compound A), with the exception of the following: 0.92g (0.002mols) of the chloro-mercuri salt of $N^6$-benzyl adenine and 1.0g (0.0025mols) of 2,3,5-tri-O-acetyl-alpha-xylofuranosyl-bromide replaced the adenine and glucopyranosyl bromide compounds employed in the preparation of Compound A. The yield of final product $N^6$-benzyl-7-beta-D-xylofuranosyl adenine (6-benzyl-7-beta-D-xylofuranosyl purine) was 0.031g (4%).

The U.V. spectrum analysis in a medium of 1/10 N $HCL/C_2H_5OH$ (95%) revealed maximum and minimum values of 282 and 246nm, respectively; in a medium of 95% $C_2H_5OH$, maximum and minimum values of 274 and 239nm, respectively, were observed; and finally in a medium of 1/10 N $NH_4OH/C_2H_5OH$ (95%), maximum and minimum values of 274 and 239nm respectively were observed. The Epsilon reading was 15,500.

Mass Spectrum analysis, revealed values of 357 (M+), 349 (M+H$_2$O), and 254 respectively.

EXAMPLE III

Preparation of Compound C

This compound, known as 6-benzylamino-7-beta-D-glucofuranosyl purine, or N$^6$-Benzyl-beta-D-glucofuranosyl adenine is prepared in the same manner as Compound A above, with the exception that 2,3,5,6-tetra-O-acetyl-alpha-glucopyranosyl bromide. The yield of final product will approximate the yield of Compound A.

ENZYMATIC STABILITY STUDIES

6-Benzylamino-7-beta-D-glucofuranosyl purine

To a reaction mixture containing alpha-glucosidase derived from yeast (2mg/ml) or beta-glucosidase derived from sweet almonds (5mg/ml), there was added 6-benzylamino-7-beta-D-glucofuranosyl purine, in an amount of 1.4 × 10$^{-4}$mols. The reaction mixture was buffered with an aqueous 0.05mol potassium acetate buffer, thus achieving a pH of 6.0.

The reaction mixture was incubated at a temperature of from 28° to 30°C for a period approximating some sixty minutes and then, the reaction mixture was quenched with 1 volume of 95% ethanol and boiled. The supernatant liquid was assayed by the Thin Layer Chromatography method (Silica gel G, 9:1 CHCl$_3$:95% ethanol) and no change was observed.

The above stability study clearly indicated that the enzymes (alpha glucosidase and beta-glucosidase) could not degrade the compound tested.

As a control, a parallel reaction mixture was employed with the exception that those enzymes referred to above were omitted. The control verified the fact that the compound tested was stable under acid conditions per se.

BIOLOGICAL ACTIVITY STUDIES

6-benzylamino-7-beta-D-glucofuranosyl purine

The biological activity of 6-benzylamino-7-beta-D-glucofuranosyl purine was determined by the standard soybean callus cytokinin assay as disclosed in the text entitled *Modern Methods of Plant Analysis* Miller, C. O. Volume VI, 194–202 (Linskens, H. F. and Tracy, M. D., Editors, Springer, Berlin) 1963.

Basically, when 5.0 × 10$^{-7}$mols of 6-benzylamino-7-beta-D-glucofuranosyl purine was administered to a soybean "callus", (tissue culture) the fresh weight (per piece) of the soybean "callus" after 30 days of growth was 5.5g and the dry weight (per piece) was 0.27g.

The "callus" was comprised of a basal medium, auxin, and the above-identified compound of this invention in its respective amount, as described above.

As a control, another tissue culture (callus) was prepared in identical fashion to that recited above but in this instance the compound, 6-benzyamino-7-beta-D-glucofuranosyl purine was not introduced. The resultant fresh weight per piece was 0.57g and the dry weight per piece was 0.045g.

The above biological activity study clearly indicates that the compounds of this invention actually stimulate growth activity.

When the above biological activity study was repeated, employing 5.0 × 10$^7$mols of 6-benzylamino-9-beta-D-glucofuranosyl purine (prior art compound), the fresh weight per piece was 0.15g and the dry weight per piece was 0.015g respectively.

As is apparent, the compounds of this invention are far more biologically active than those compounds of the prior art.

BIOLOGICAL STABILITY STUDIES

6-benzylamino-7-beta-D-glucofuranosyl purine

Radiolabeled(8-C$_{14}$, methylene C$_{14}$, or tritiated methylene)-6-benzylamine-7-beta-D-glucofuranosyl purine was administered via inclusion in the media to soybean callus. The callus was grown for four weeks, extracted with a 70% ethanol solution in water. The extract was analyzed by paper chromatography in a butanol/acetic acid/water mixture (4:1:1 ratio.) The only recovered radiolabeled material was that of the above noted purine compound. Consequently, the stability of 6-benzylamino-7-beta-D-glucofuranosyl purine was established.

In comparison to the above, the prior art clearly recognizes the instability of the cytokinin-9-nucleoside derivatives as evidenced by the results disclosed by Yoshida, R. and Oritana, F. in the literature reference entitled *Plant Cell Physiology*, Volume XIII, 337–343 (1972).

A review of the results in terms of biological stability established for the corresponding cytokinin-9-nucleoside derivatives of this invention as compared to the results set forth above for 6-benzylamino-8-beta-D-glucofuranosyl purine will clearly establish the superiority of the compounds of this invention over the 9-derivatives.

Although the present invention has been aptly described in the foregoing specification and examples included therein, it is readily apparent that various changes and/or modifications can be made thereto by the skilled artisan without the departing from the spirit and scope thereof.

What we claim is:

1. A novel cytokinin-7-nucleoside compound of the formula:

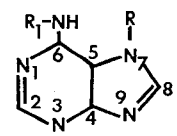

wherein R$_1$ represents a member selected from the group consisting of a —CH$_2$—C$_6$H$_5$ group, a —C$_2$H$_4$—C$_6$H$_5$ group, and a —CH$_2$Y group, wherein Y represents a member selected from the group consisting of a furfuryl group, a pyridyl group, a thiophene group, a C$_5$–C$_7$ cycloalkyl group, and a C$_5$–C$_7$ cycloalkenyl group, and a —CH$_2$—C$_6$H$_4$—X group, wherein X represents a member selected from the group consisting of an alkyl group of from 1 to 3 carbon atoms, a branched alkyl group of 3 carbon atoms, an alkenyl group of from 1 to 3 carbon atoms, a branched alkenyl group of 3 carbon atoms, a halogen atom, and a CF$_3$group; and wherein R represents a monosaccharide.

2. The compound of claim 1, wherein R$_1$ is a benzyl group.

3. The compound of claim 1, wherein said R represents a member selected from the group consisting of glucofuranose, glucopyranose, galactose, ribose, mannose, fructose, and xylose.

4. The compound of claim 3, wherein said member is a member selected from the group consisting of glucofuranose, glucopyranose, and xylose.

5. The compound of claim 1, wherein R represents a glucopyranose group.

6. The compound of claim 1, wherein R represents a glucofuranose group.

7. The compound of claim 1, wherein R represents a xylofuranose group.

* * * * *